(12) United States Patent
Su et al.

(10) Patent No.: US 9,810,422 B2
(45) Date of Patent: Nov. 7, 2017

(54) FLOATING APPARATUS FOR FIXING MEMBRANE CABLE FOR FAN MODULE LIGHTING

(71) Applicant: Dell Products L.P., Round Rock, TX (US)

(72) Inventors: Iou Ren Su, Keelung (TW); Raymond Dewine Heistand, II, Round Rock, TX (US); Chun Yang Tseng, Taipei (TW); Hsu-Chu Wang, Taipei (TW); Hung-I Lin, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 15/015,819

(22) Filed: Feb. 4, 2016

(65) Prior Publication Data

US 2017/0227211 A1 Aug. 10, 2017

(51) Int. Cl.
| F21S 4/24 | (2016.01) |
| F21V 33/00 | (2006.01) |
| G06F 1/20 | (2006.01) |
| G06F 1/18 | (2006.01) |
| F21Y 115/10 | (2016.01) |

(52) U.S. Cl.
CPC ............ *F21V 33/0096* (2013.01); *F21S 4/24* (2016.01); *G06F 1/18* (2013.01); *G06F 1/20* (2013.01); *F21Y 2115/10* (2016.08)

(58) Field of Classification Search
None
See application file for complete search history.

(56) References Cited

U.S. PATENT DOCUMENTS

| 3,221,096 A | * | 11/1965 | Croghan | H01R 4/2491 |
| | | | | 174/88 R |
| 3,569,909 A | * | 3/1971 | Garver | H01R 13/6273 |
| | | | | 439/353 |
| 3,671,921 A | * | 6/1972 | Baker, III | H01R 13/502 |
| | | | | 439/353 |
| 3,977,756 A | * | 8/1976 | Rodondi | H01R 12/62 |
| | | | | 439/357 |
| 4,299,433 A | * | 11/1981 | Jayne | H01R 13/6272 |
| | | | | 439/329 |
| 4,695,258 A | * | 9/1987 | Hanson | H01R 12/79 |
| | | | | 439/329 |
| 4,768,971 A | * | 9/1988 | Simpson | H01R 12/82 |
| | | | | 439/329 |
| 4,850,883 A | * | 7/1989 | Kabadi | H01R 12/62 |
| | | | | 439/329 |
| D319,427 S | * | 8/1991 | Ichitsubo | D13/147 |

(Continued)

*Primary Examiner* — Xanthia C Cunningham
(74) *Attorney, Agent, or Firm* — Baker Botts L.L.P.

(57) ABSTRACT

A floating apparatus for fixing a membrane cable coupled to a fan gantry within an information handling system is disclosed. The floating apparatus includes a flange member with a horizontal planar portion and a vertical planar portion. The vertical planar portion is configured for insertion into an edge connector and includes and an overhang on the anterior side of the vertical planar portion most distal to the horizontal planar portion. The flange member is further configured to attach to a membrane cable and is connected to support members, which allow the floating apparatus to move in a plurality of alignment positions.

20 Claims, 7 Drawing Sheets

(56) References Cited

U.S. PATENT DOCUMENTS

| | | | | |
|---|---|---|---|---|
| 5,044,975 A * | 9/1991 | DiBene, II | H01R 13/6275 | 439/153 |
| 5,074,797 A * | 12/1991 | Yamada | H01R 12/89 | 439/260 |
| 5,224,865 A * | 7/1993 | Woith | H01R 12/62 | 439/493 |
| 5,798,907 A * | 8/1998 | Janik | G06F 1/163 | 361/679.03 |
| 6,017,222 A * | 1/2000 | Kao | H01R 12/613 | 439/493 |
| 6,146,189 A * | 11/2000 | Nomura | H01R 12/62 | 439/153 |
| 6,302,705 B1 * | 10/2001 | Yatskov | H01R 9/096 | 439/67 |
| 6,356,449 B1 * | 3/2002 | Sasaki | G11B 5/4853 | 235/406 |
| 6,404,598 B1 * | 6/2002 | Nayak | G11B 5/584 | 360/256.1 |
| 6,494,736 B2 * | 12/2002 | Mito | H01R 13/6273 | 439/357 |
| 6,592,380 B2 * | 7/2003 | Miyazawa | H01R 12/592 | 439/329 |
| 6,769,920 B1 * | 8/2004 | Mease | G06F 1/18 | 439/493 |
| 6,790,074 B1 * | 9/2004 | Chiu | H01R 12/88 | 439/260 |
| 7,264,490 B1 * | 9/2007 | Reznikov | H01R 13/62933 | 439/152 |
| 7,281,953 B1 * | 10/2007 | Jochym | H01R 31/06 | 361/749 |
| 7,318,745 B1 * | 1/2008 | Kottke | G06F 1/1601 | 439/493 |
| 7,339,768 B2 * | 3/2008 | Ito | G11B 5/0083 | 360/261.1 |
| 7,734,083 B2 * | 6/2010 | Teramoto | H04N 5/2251 | 382/147 |
| 8,004,797 B2 * | 8/2011 | Poorman | G11B 5/4893 | 360/241 |
| 8,059,355 B2 * | 11/2011 | Nayak | G11B 5/584 | 360/75 |
| 8,264,795 B2 * | 9/2012 | Poorman | G11B 5/4893 | 360/241 |
| 8,297,856 B2 * | 10/2012 | Banal, Jr. | G02B 6/4244 | 385/135 |
| 8,562,149 B2 * | 10/2013 | Hu | G03B 21/145 | 348/771 |
| 9,385,450 B2 * | 7/2016 | Wu | H01R 12/52 | |
| 9,466,334 B1 * | 10/2016 | Biskeborn | G11B 33/122 | |
| 2004/0233581 A1 * | 11/2004 | Poorman | H05K 1/028 | 360/241 |
| 2005/0105271 A1 * | 5/2005 | Lu | H05K 7/20172 | 361/695 |
| 2005/0117854 A1 * | 6/2005 | Chiu | G02B 6/3825 | 385/92 |
| 2008/0174636 A1 * | 7/2008 | Kim | B41J 2/14024 | 347/47 |
| 2013/0089997 A1 * | 4/2013 | Orris | H01R 12/592 | 439/329 |
| 2014/0322946 A1 * | 10/2014 | Genest | H01R 13/627 | 439/329 |
| 2016/0141778 A1 * | 5/2016 | Takahashi | H01R 12/79 | 439/329 |

* cited by examiner

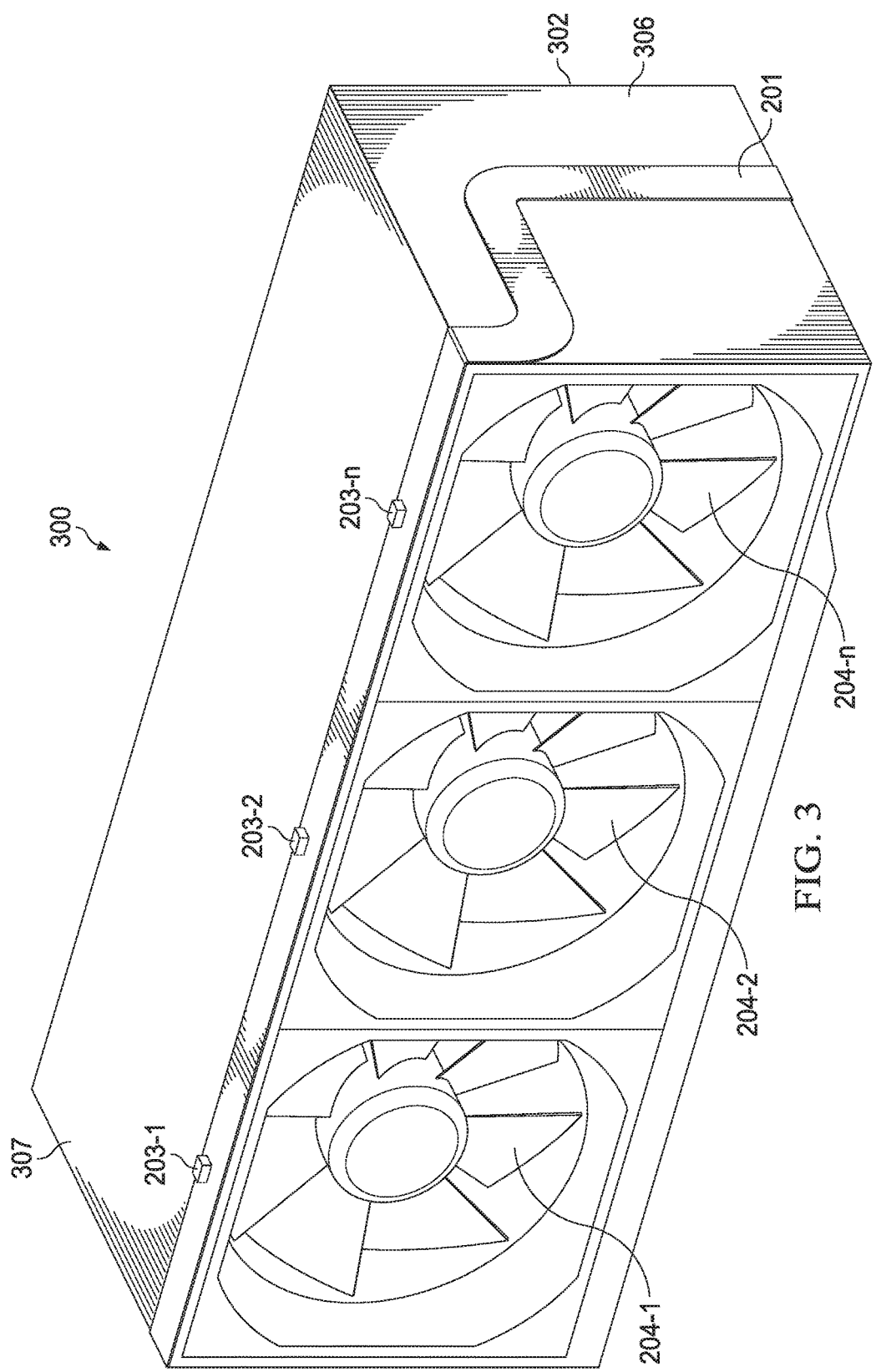

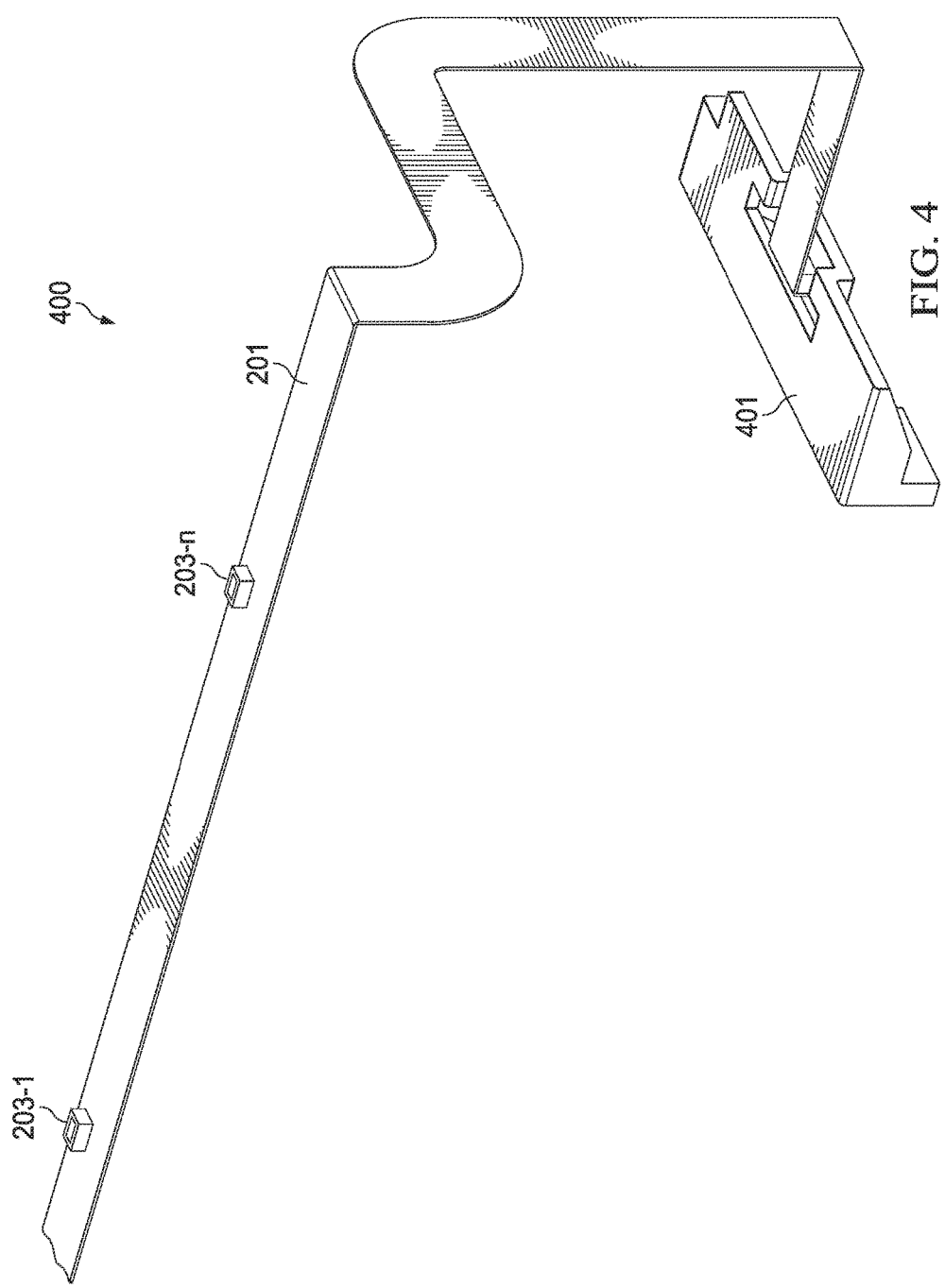

FLOATING APPARATUS FOR FIXING MEMBRANE CABLE FOR FAN MODULE LIGHTING

BACKGROUND

Field of the Disclosure

This disclosure relates generally to information handling systems and more particularly to fan module lighting of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may process, store, and communicate information and may include one or more computer systems, data storage systems, and networking systems.

In various information handling systems, lighting is used for both functional and decorative purposes. Placement of lighting within various information handling systems allows for optimization of space and may facilitate thermal venting so that the information handling system operates correctly.

SUMMARY

In one aspect is a disclosed floating apparatus comprising a flange member configured to attach to a membrane cable within an information handling system. The flange member may include a horizontal planar portion and a vertical planar portion. The vertical planar portion may be configured for insertion into an edge connector and may include an overhang on the anterior side of the vertical planar portion most distal to the horizontal planar portion. The flange member also may include a first support member and a second support member extending from the flange member. The support members may be configured for movement in a plurality of alignment positions.

Another disclosed aspect includes a cabling subassembly comprising a floating apparatus and a membrane cable coupled to the floating apparatus. The membrane cable may include a plurality of indicator lights. The floating apparatus may include a flange member configured to attach to the membrane cable. The flange member may include a horizontal planar portion and a vertical planar portion. The vertical planar portion may be configured for insertion into an edge connector and may include an overhang on the anterior side of the vertical planar portion most distal to the horizontal planar portion. The flange member also may include a first support member and a second support member extending from the flange member. The support members may be configured for movement in a plurality of alignment positions.

Another disclosed aspect includes an information handling system comprising a plurality of fans arranged linearly within a fan gantry, a floating apparatus, and a membrane cable coupled to the floating apparatus. The membrane cable may include a plurality of indicator lights. The floating apparatus may include a flange member configured to attach to the membrane cable. The flange member may include a horizontal planar portion and a vertical planar portion. The vertical planar portion may be configured for insertion into an edge connector and may include an overhang on the anterior side of the vertical planar portion most distal to the horizontal planar portion. The flange member also may include a first support member and a second support member extending from the flange member. The support members may be configured for movement in a plurality of alignment positions.

BRIEF DESCRIPTION OF THE DRAWINGS

For a more complete understanding of the present invention and its features and advantages, reference is now made to the following description, taken in conjunction with the accompanying drawings, in which:

FIG. 3 is an isometric view of selected elements of an embodiment of a fan system used within an information handling system;

FIG. 4 is an isometric view of selected elements of an embodiment of a floating apparatus coupled to a membrane cable with indicator lights for use in an information handling system;

DESCRIPTION OF PARTICULAR EMBODIMENT(S)

Figure 1:
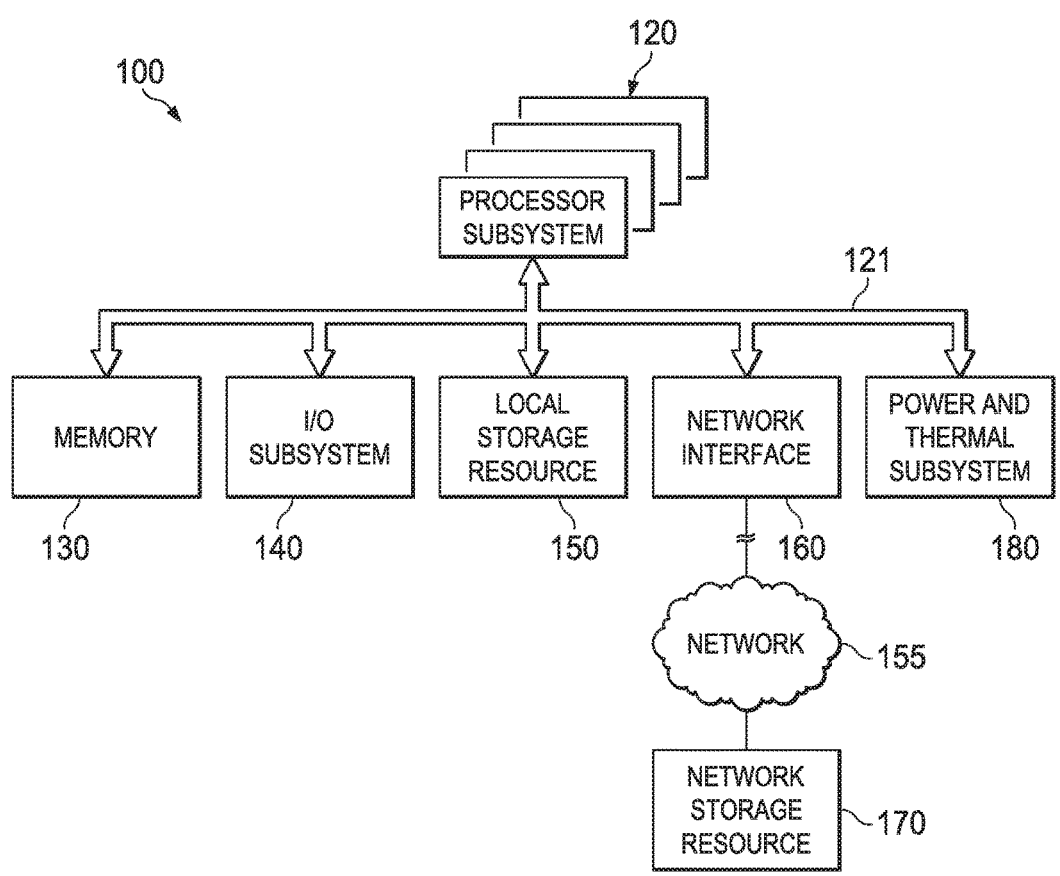
FIG. 1 is a block diagram of selected functional elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Particular embodiments are best understood by reference to FIGS. 1-5 wherein like numbers are used to indicate like and corresponding parts.

FIG. 1 illustrates a block diagram of selected functional elements of an embodiment of an information handling system 100. As discussed above, information handling system 100 may be used to process and store information for various purposes. As will be described in more detail below, information handling system 100 may include various systems and apparatuses such as a floating apparatus coupled to a membrane cable with indicator lights. In FIG. 1, external or remote elements such as network 155 and network storage resource 170 are also shown to give context to an environment in which information handling system 100 may be configured to operate.

As shown in FIG. 1, components of information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, network interface 160, and power and thermal subsystem 180. System bus 121 may represent a variety of suitable types of bus structures, such as a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI Express (PCIe) bus, HyperTransport (HT) bus, and Video Electronics Standards Association (VESA) local bus.

In FIG. 1, network interface 160 may include a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a network attached storage (NAS), a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include one or more microprocessors, microcontrollers, digital signal processors (DSPs), application specific integrated circuits (ASICs), or other digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In FIG. 1, local storage resource 150 may comprise computer-readable media (e.g., hard disk drive, solid state drive, floppy disk drive, CD-ROM, and/or other types of rotating storage media, flash memory, EEPROM, and/or other types of solid state storage media) and may be generally operable to store instructions and/or data. For example, local storage resource 150 may store executable code in the form of program files that may be loaded into memory subsystem 130 for execution. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces.

As shown, information handling system 100 may also include a power and thermal subsystem 180. Power and thermal subsystem 180 may be implemented in any suitable manner. For example, power and thermal subsystem 180 may include one or more components such as power supplies, power controllers, fans, fan controllers, heat sinks, air baffles, etc., configured to provide power to components within information handling system 100 and to ensure that thermal design constraints for the components are met (e.g., by cooling the components). Accordingly, certain components included within information handling system 100 (e.g., components within processor subsystem 120, memory 130, etc.) may operate by consuming power provided by power and thermal subsystem 180. In certain examples, designers of information handling system 100 may budget and account for power expected to be consumed by one or more of the components and may design power and thermal subsystem 180 to include an appropriate power supply configured to power the components.

Additionally, power and thermal subsystem 180 may be configured to cool components within information handling system 100 to ensure that the components satisfy various thermal design constraints. For example, thermal design constraints may be satisfied when an airflow passes over a component or through a heat sink associated with the component in order to properly cool the component. As such, power and thermal subsystem 180 may include one or more fans to generate the airflow. The fans may be contained in a fan gantry, which may include one or more indicator lights contained within one membrane cable. As will be described in more detail below, the membrane cable may be coupled to a floating apparatus, which may be configured to facilitate membrane cable coupling to the fan gantry and to other components within information handling system 100.

Figure 2:
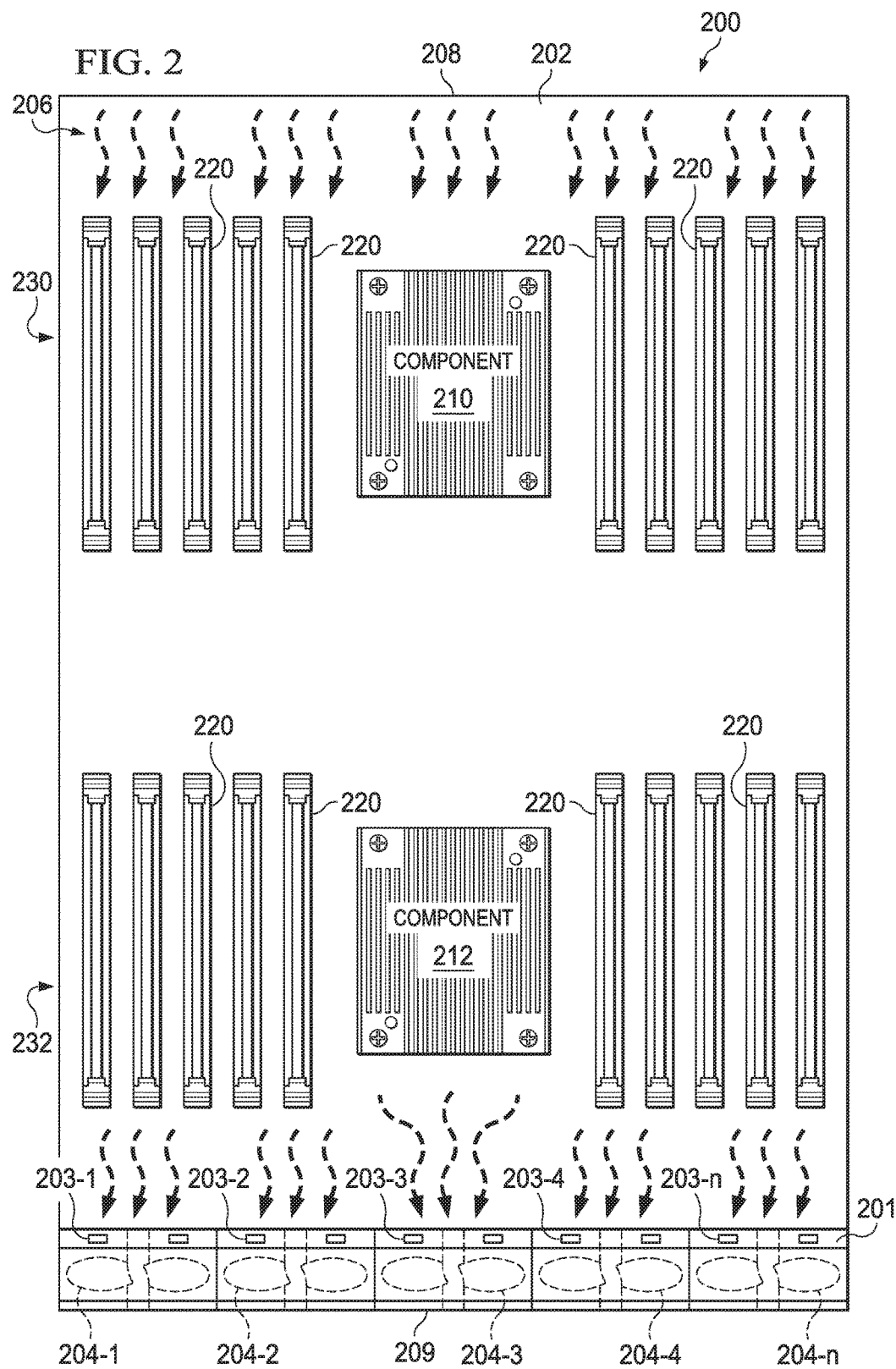
FIG. 2 is a block diagram of selected hardware elements of an embodiment of an information handling system.

FIG. 2 is a block diagram of selected hardware elements of an embodiment of an information handling system 200 with fan module lighting 203 (e.g. fan module lighting 203-1 to 203-n) that is routed on the top of the fan module, according to embodiments of the present disclosure. FIG. 2 shows a component layout view of certain exemplary hardware components of information handling system 200. The components shown in FIG. 2 are not drawn to scale and information handling system 200 may contain additional or fewer components than the components shown in FIG. 2. Components of information handling system 200 may be interconnected with each other as well as with other components not shown in FIG. 2. For example, information handling system 200 may be interconnected with one or more other information handling systems. However, connections between components may be omitted in FIG. 2 for descriptive clarity. In FIG. 2, information handling system 200 may implement an embodiment of information handling system 100 described above with respect to FIG. 1. In one embodiment, information handling system 200 may include fan module lighting. In a further embodiment, information handling system 200 may include an apparatus for fixing membrane cables for such fan module lighting. In another, further embodiment, such an apparatus may be floating.

Information handling system 200 may include circuit board 202. Circuit board 202 may be associated with one or more additional circuit boards or other components of information handling system 200 and/or may be associated with or enclosed within any chassis that may suit a particular embodiment. Within information handling system 200, circuit board 202 may contain, support, or otherwise be associated with one or more hardware components. For example, circuit board 202 may support hardware components such as by providing conductive pads upon which the components may be soldered or releasably attached, and electrical connections to allow components on circuit board 202 to communicate one with another.

Hardware components on circuit board 202 may include any suitable components adapted to a particular embodiment of information handling system 200. For example, FIG. 2 illustrates components such as component 210, component 212, and various dual in-line memory modules (DIMMs) 220 on circuit board 202. Components 210 and 212 may represent components within information handling system 200. For example, components 210 and 212 may include CPUs operating with DIMMs 220, co-processors, or application-specific integrated circuits (ASICS), according to principles of information handling systems described above in relation to FIG. 1. Although not explicitly shown in FIG. 2 for descriptive clarity, various other hardware components may also be included on circuit board 202. In certain examples, circuit board 202 may be very densely packed with components such that all or nearly all of circuit board 202 is utilized by components. In certain examples, a bottom side of circuit board 202 (not shown) may also include components.

Certain hardware components within information handling system 200 may be loadable and interchangeable. For example, as an alternative to directly soldering the hardware components to circuit board 202, various sockets or slots may be provided on circuit board 202 to allow the components to be dynamically loaded onto circuit board 202, removed, replaced, interchanged with other components, etc. For example, DIMMs 220 may each be seated in a DIMM slot (not expressly shown) and coupled to the DIMM slot using a locking mechanism the DIMM slot may provide. In other examples, chip-type components such as chips configured with ball grid array (BGA), pin grid array (PGA), land grid array (LGA), dual inline package (DIP), or other packaging types may also be adapted for use with a socket on circuit board 202. For example, components 210 and 212 may be configured to be seated within sockets on circuit board 202 (not expressly shown).

Certain hardware components within information handling system 200 (e.g., components included on circuit board 202) may consume power and increase in temperature during operation. These components may include fans 204 (e.g., fans 204-1 through 204-n) and DIMMS 220. If this temperature increase is not restrained, the components may reach a temperature at which the components or other components in proximity to them will fail or experience other undesirable consequences. Information handling system 200 may thus be configured to constrain the temperature of various components. Information handling system 200 may constrain the temperature by generating an airflow to carry heat away from the components and to expel the heat outside of information handling system 200.

For example, as shown in FIG. 2, information handling system 200 may include one or more fans 204 (e.g., fans 204-1 through 204-n). Fans 204 may be configured to generate an airflow 206 for cooling information handling system 200. Airflow 206 may flow in any suitable direction. For example, fans 204 may suck air from an upstream end 208 of circuit board 202 toward a downstream end 209, as indicated by the direction of the arrows representing airflow 206. Relatively cool air may enter information handling system 200 at upstream end 208. The air may get progressively warmer as the air flows over circuit board 202 carrying away heat from various hardware components until the air is expelled by fans 204 at downstream end 209. In another example, fans 204 may be arranged near upstream end 208 and may blow air over circuit board 202 to generate airflow 206.

As shown, airflow 206 is illustrated by wavy arrows generally pointing toward downstream end 209 to represent fans 204 causing air to flow from upstream end 208 toward downstream end 209. Airflow 206 may move over components, through heat sinks associated with components, between components, etc. As airflow 206 moves from upstream end 208 to downstream end 209, airflow 206 may interact with various components and/or other protrusions along circuit board 202. For example, when airflow comes into contact with a component having a higher temperature than airflow 206, heat from the component may convectively transfer into airflow 206 to be carried away by airflow 206 out of information handling system 200. In this way, airflow 206 may facilitate cooling of the components within information handling system 200.

Certain fans 204 may be configured with one or more indicator lights (e.g. indicator lights 203-1 through 203-n). Indicator lights 203 may be implemented, for example, by light emitting diodes (LEDs) or other suitable lights. Indicator lights 203 for each fan 204 contained within a fan gantry may be combined into one membrane cable 201. Combining indicator lights into one membrane cable may effectively decrease the space needed to linearly contain one or more fans 204 (e.g., fans 204-1 though 204-n) in a fan gantry. Membrane cable 201 may be made out of any suitable material. Contemplated materials include nonconductive, flexible materials such as mylar or polyimide. Membrane cable 201 may have indicator light holes through which the indicator lights 203 may be exposed. Indicator lights 203 may turn off, meaning there is no emission of light, and on, meaning there is emission of light. Indicator lights 203 may be in the off mode when fans 204 operate correctly and may be in the on mode when fans 204 are damaged. A fan may operate correctly when its rotational speed falls within a predetermined range and may be damaged when its rotational speed falls outside of a predetermined range. Each indicator light may correspond to one fan. For example, indicator light 203-1 may correspond to fan 204-1 while indicator light 203-2 corresponds to fan 204-2. If fan 204-1 is damaged, for example, indicator light 203-1 may turn on. Similarly, if fan 204-2 is damaged, indicator light 203-2 may turn on. Indicator lights 203 in membrane cable 201 may route to both a power source and a controller. The power source may provide electricity to the indicator lights and the controller may turn indicator lights 203 on and off.

In certain examples, information handling system 200 may be impaired when design constraints designating the placement of membrane cable 201 are not followed. For example, if membrane cable 201 was routed in the side wall (not shown) of more than one fans 204 (e.g., fans 204-1 through 204-n) rather than on the fan gantry, membrane cable 201 may impact thermal venting of fans 204 (e.g. fans 204-1 through 204-n).

To illustrate, FIG. 3 shows an isometric view of selected elements of an embodiment of fan system 300 used within an information handling system such as information handling system 200. Fan system 300 may include a plurality of fans 204 (e.g., fans 204-1 through 204-n), discussed above in relation to FIG. 2, arranged linearly within fan gantry 302. Fan gantry 302 may be coupled with membrane cable 201, discussed above in relation to FIG. 2, by a double-sided adhesive or preferably by mechanical fasteners such as a snap rivet. If a mechanical fastener such as a snap rivet is used, membrane cable 201 may have rivet holes for the placement of snap rivets. The use of mechanical fasteners or a double-sided adhesive may allow the membrane cable to be easily installed and removed from the fan gantry should any repairs need to be made. However, the membrane cable may not necessarily need to be removed to make repairs to one or more fans. Membrane cable 201 may also include one or more indicator lights 203 (e.g., indicator lights 203-1 through 203-n), discussed above in relation to FIG. 2. Membrane cable 201 may route on fan gantry's 302 top wall 307 and side wall 306. Although not explicitly shown in FIG. 3, other alternatives are contemplated. For example, membrane cable 201 may be configured to route on the fan gantry back wall or front wall.

FIG. 4 shows a top view of selected elements of an embodiment of membrane cable 201 including indicator lights 203 (e.g. indicator lights 203-1 through 203-n) coupled to a configurable floating apparatus 401. Specifically, FIG. 4 shows membrane cable 201, discussed above in relation to FIGS. 2 and 3, being coupled to floating apparatus 401. Membrane cable 201 may be coupled to floating apparatus 401 by a double-sided adhesive or by being soldered. If membrane cable 201 is soldered to floating apparatus 401, membrane cable 201 and floating apparatus 401 may include any type of alloy device to allow for soldering. Floating apparatus 401 may facilitate membrane cable 201 routing on and coupling to fan gantry 302, as described above in reference to FIG. 3, which may decrease the space needed to linearly contain one or more fans in a fan gantry. Floating apparatus 401 may also hold membrane cable 201 in place by inserting membrane cable 201 into an edge connector, as will be shown in the figures that follow. Additionally, floating apparatus 401 may be made from any suitable material. Contemplated materials include relatively stiff and nonconductive materials such as plastics or die cast.

Figure 5A:
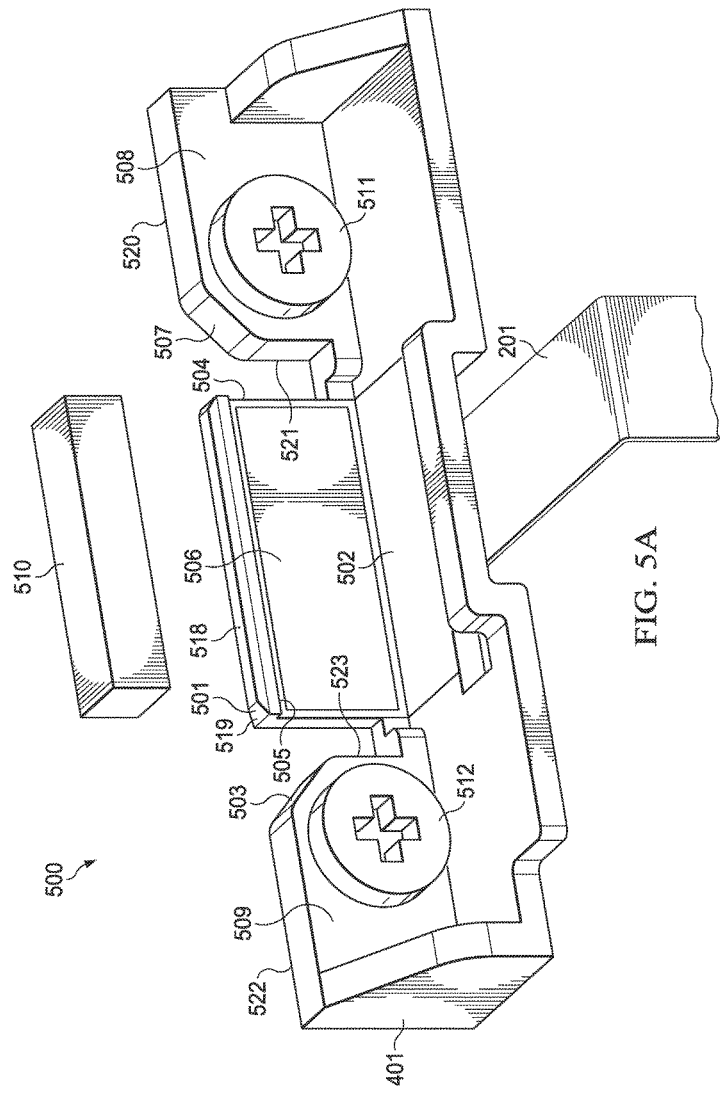
FIG. 5A is an isometric bottom view of selected elements of an embodiment of a floating apparatus coupled to a membrane cable and configured to be inserted into an edge connector in an information handling system.
Figure 5B:
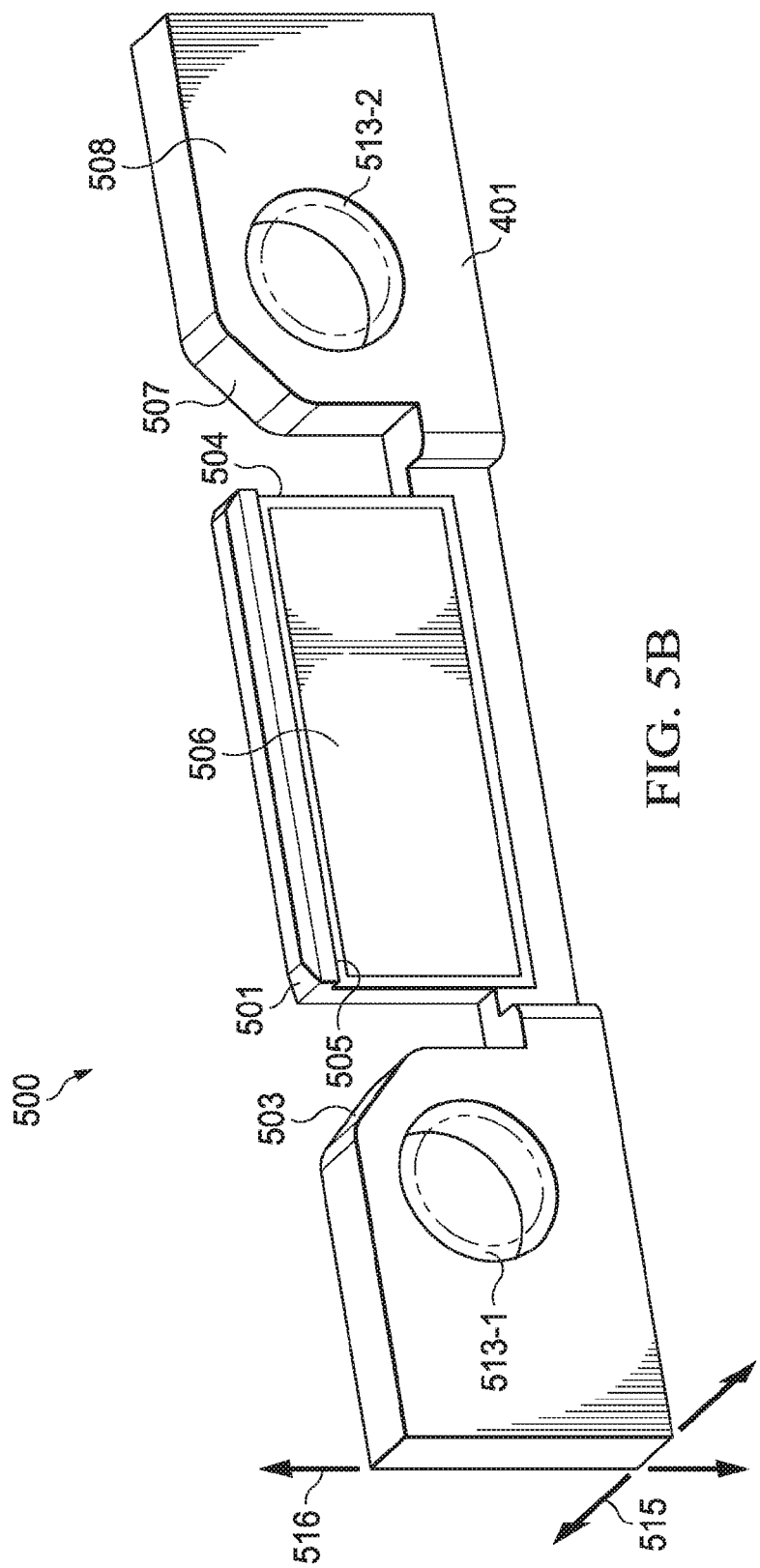
FIG. 5B is an isometric bottom view of selected elements of an embodiment of a floating apparatus configured to move in the z-direction in an information handling system.
Figure 5C:
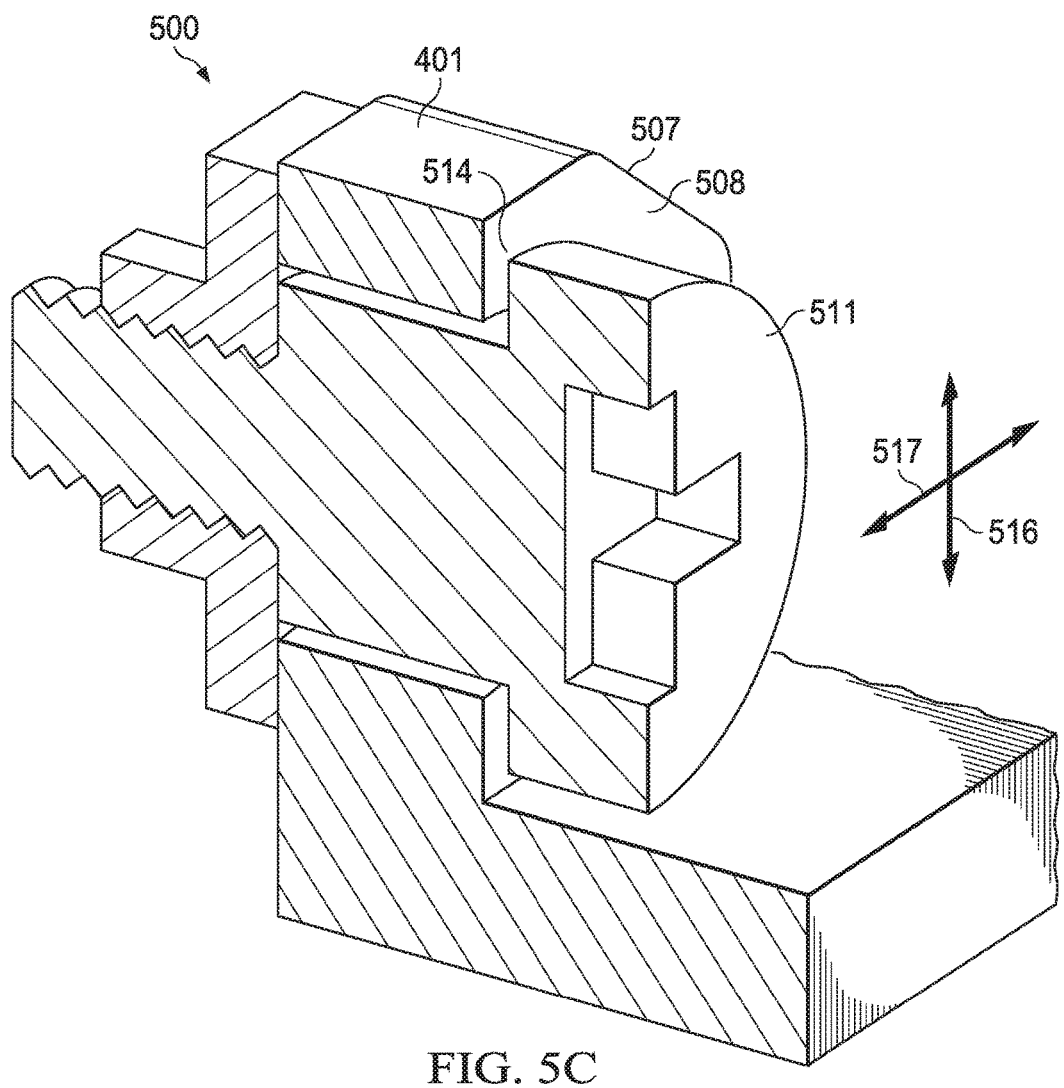
FIG. 5C is an exploded cross-sectional view of selected elements of an embodiment of a floating apparatus configured to move in the x-direction in an information handling system.

FIG. 5 (e.g. FIGS. 5A through 5C) shows various bottom views of selected elements of an embodiment of a configurable floating apparatus coupled to a membrane cable. As shown in FIG. 5A, floating apparatus 401 may hold membrane cable 201, as discussed above in relation to FIGS. 2, 3, and 4, in place by coupling floating apparatus 401 to edge connector 510. More specifically, floating apparatus 401 may have flange member 504, which may include horizontal planar portion 502 and vertical planar portion 506. Both horizontal planar portion 502 and vertical planar portion 506 may be attached to membrane cable 201. Vertical planar portion 506, which may be attached to membrane cable 201, may be inserted into edge connector 510 to couple floating apparatus 401 to edge connector 510.

Additionally, flange member 504 may have chamfer feature 501 and may have overhang 505. Chamfer feature 501 may be associated with the side of vertical planar portion 506 most distal to horizontal planar portion 502. Chamfer feature 501 may extend angularly from bottom surface 519 of vertical planar portion 506 to planar surface 518. The angle in which chamfer feature 501 extends from bottom surface 519 of vertical planar portion 506 may range from about 20 degrees to about 60 degrees, and preferably about 45 degrees, relative to bottom surface 519 of vertical planar portion 506. Functionally, chamfer feature 501 may guide the insertion of vertical planar portion 506 into edge connector 510. Chamfer feature 501 may also allow for easier blind insertion when the edge connector is not visible for insertion. Overhang 505 may be associated with the anterior side of vertical planar portion 506 most distal to horizontal planar portion 502. Overhang 505 may ensure that membrane cable 201 does not peel or separate from flange member 504 during insertion of vertical planar portion 506 into edge connector 510. Accordingly, in one embodiment, overhang 505 may preferably measure 0.20 millimeters (mm) wide. However, other alternatives are contemplated. For example, overhang 505 may measure from approximately 0.10 mm to 0.90 mm wide.

Floating apparatus 401 may also include a left support member 508 and a right support member 509 that extend from flange member 504. Left support member 508 may have slope feature 507, which may be located on the corner of left support member 508 most proximal to overhang 505. Slope feature 507 may angle from bottom surface 520 to side surface 521. The angle may range from about 100 to 170 degrees, and preferably about 120 degrees relative to bottom surface 520. The point at which slope feature 507 starts to angle from bottom surface 520 may be a soft curve rather than a distinct inflection point. Similarly, the point at which slope feature 507 starts to angle from side surface 521 may be a soft curve rather than a distinct inflection point.

Right support member 509 also may have slope feature 503, which may be located on the corner of right support member 509 most proximal to overhang 505. Slope feature 503 may angle from bottom surface 522 to side surface 523. The angle may range from about 100 to 170 degrees, and preferably about 120 degrees relative to bottom surface 522. The point at which slope feature 503 starts to angle from bottom surface 522 may be a soft curve rather than a distinct inflection point. Similarly, the point at which slope feature 503 starts to angle from side surface 523 may be a soft curve rather than a distinct inflection point. Slope features 507 and 503 may allow for increased ease of insertion of vertical planar portion 506 into edge connector 510.

Left support member 508 may have shoulder screw 511 and right support member 509 may have shoulder screw 512. Although not explicitly shown in FIG. 5, other alternative methods of affixing left support member 508 and right support member 509 are contemplated such as nails, bolts, and other types of screws. Shoulder screw 511 and shoulder screw 512 may allow for floating apparatus 401 to be preferably coupled to the bottom of fan gantry 302, discussed above in relation to FIG. 3. However, floating apparatus 401 may also be located outside fan system 300, as discussed above in relation to FIG. 3.

FIG. 5B is a bottom view of selected elements of an embodiment of floating apparatus 401, as discussed above in relation to FIG. 5A, configured to move in z-direction 515. Specifically, FIG. 5B shows design gap 513 (e.g., 513-1 and 513-2), which may constrain floating apparatus 401 movement in y-direction 516. However, design gap 513 may provide for floating apparatus 401 movement from approximately 0.40 mm to 1.10 mm in z-direction 515. Allowing for floating apparatus 401 movement in z-direction 515 may relieve stress on floating apparatus 401 during assembly. For example, if floating apparatus 401 is not aligned with edge connector 510 during insertion of vertical planar portion 506 into edge connector 510, floating apparatus 401 may be subject to stress, which may cause damage such as cracking in the infrastructure of floating apparatus 401. Design gap 513 may allow floating apparatus 401 to move in z-direction 515 so that floating apparatus 401 may self-align to relieve any stress.

FIG. 5C shows an exploded cross-sectional view of selected elements of an embodiment of configurable floating apparatus 401, as discussed above in relation to FIGS. 5A and 5B, configured to move in x-direction 517. Like FIGS. 5A and 5B, FIG. 5C is not drawn to scale, and floating apparatus 401 may include fewer or additional elements than the elements illustrated and described in relation to FIG. 5C. FIG. 5C shows design gap 514, which may constrain floating apparatus 401 movement in y-direction 516. However, design gap 514 may provide for floating apparatus 401 movement from approximately 0.40 mm to 1.10 mm in x-direction 517. Although FIG. 5C shows design gap 514 for left support member 508, the same design gap 514 may be present in right support member 509, as discussed above in relation to FIG. 5A. Similar to allowing floating apparatus 401 movement in z-direction 515, as discussed above in relation to FIG. 5B, allowing floating apparatus 401 movement in x-direction 517 may also relieve stress during assembly. For example, stress may be relieved during insertion of flange member 504 into edge connector 510. Additionally, in some embodiments, floating apparatus 401 may be configured to move in just z-direction 515 or just x-direction 517. In other embodiments, floating apparatus 401 may be configured to move in both z-direction 515 and x-direction 517.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A floating apparatus, comprising a flange member configured to attach to a membrane cable within an information handling system, the flange member including:
   a horizontal planar portion and a vertical planar portion, wherein:
      the vertical planar portion is configured for insertion into an edge connector; and
      the vertical planar portion includes an overhang on the anterior side of the vertical planar portion most distal to the horizontal planar portion; and
   a first support member and a second support member extending from the flange member, wherein the support members are configured to allow for movement in a plurality of alignment positions.

2. The floating apparatus of claim 1, wherein the flange member further includes a chamfer feature associated with the side of the vertical planar portion most distal to the horizontal planar portion.

3. The floating apparatus of claim 1, wherein the overhang is approximately 0.10 millimeters (mm) to 0.90 mm wide.

4. The floating apparatus of claim 1, wherein the support members include a first hole and a second hole configured to allow for movement from approximately 0.40 mm to 1.10 mm in the x-direction.

5. The floating apparatus of claim 4, wherein the support members include a first hole and a second hole, the first hole and the second hole configured to allow for movement from approximately 0.40 mm to 1.10 mm in the z-direction.

6. The floating apparatus of claim 1, wherein the support members are configured to constrain apparatus movement in the y-direction.

7. The floating apparatus of claim 1, wherein the support members further include a slope feature on the corner most proximal to the overhang on the side of the vertical planar portion of the flange.

8. A cabling subassembly, comprising:
   a floating apparatus; and a membrane cable coupled to the floating apparatus and including a plurality of indicator lights;

wherein the floating apparatus includes:
- a flange member configured to attach to the membrane cable, the flange member including:
  - a horizontal planar portion and a vertical planar portion, wherein:
    - the vertical planar portion is configured for insertion into an edge connector; and the vertical planar portion includes an overhang on the anterior side of the vertical planar portion most distal to the horizontal planar portion; and
  - a first support member and a second support member extending from the flange member, wherein the support members are configured to allow for movement in a plurality of alignment positions.

9. The cabling subassembly of claim 8, wherein the flange member further includes a chamfer feature associated with the side of the vertical planar portion most distal to the horizontal planar portion.

10. The cabling subassembly of claim 8, wherein the overhang is approximately 0.10 mm to 0.90 mm wide.

11. The cabling subassembly of claim 8, wherein the support members include a first hole and a second hole configured to allow for movement from approximately 0.40 mm to 1.10 mm in the x-direction, the z-direction, or both the x-direction and the z-direction.

12. The cabling subassembly of claim 8, wherein the support members are configured to constrain apparatus movement in the y-direction.

13. The cabling subassembly of claim 8, wherein the support members further include a slope feature on the corner most proximal to the overhang on the side of the vertical planar portion of the flange.

14. An information handling system comprising:
- a plurality of fans arranged linearly within a fan gantry;
- a floating apparatus; and
- a membrane cable coupled to the floating apparatus and including a plurality of indicator lights;

wherein the floating apparatus includes:
- a flange member configured to attach to the membrane cable, the flange member including:
  - a horizontal planar portion and a vertical planar portion, wherein:
    - the vertical planar portion is configured for insertion into an edge connector; and the vertical planar portion includes an overhang on the anterior side of the vertical planar portion most distal to the horizontal planar portion; and
  - a first support member and a second support member extending from the flange member, wherein the support members are configured to allow for movement in a plurality of alignment positions.

15. The information handling system of claim 14, wherein the floating apparatus is coupled to the bottom side of the fan gantry.

16. The information handling system of claim 14, wherein the flange member further includes a chamfer feature associated with the side of the vertical planar portion most distal to the horizontal planar portion.

17. The information handling system of claim 14, wherein the overhang is approximately 0.10 mm to 0.90 mm wide.

18. The information handling system of claim 14, wherein the support members include a first hole and a second hole, the first hole and the second hole configured to allow for movement from approximately 0.40 mm to 1.10 mm in the x-direction, the z-direction, or both the x-direction and the z-direction.

19. The information handling system of claim 14, wherein the support members are configured to constrain apparatus movement in the y-direction.

20. The information handling system of claim 14, wherein the support members further include a slope feature on the corner most proximal to the overhang on the side of the vertical planar portion of the flange.

* * * * *